US008582672B2

(12) United States Patent  (10) Patent No.: US 8,582,672 B2
Sanayei  (45) Date of Patent: Nov. 12, 2013

(54) SYSTEM AND METHOD FOR WIRELESS COMMUNICATIONS USING SPATIAL MULTIPLEXING WITH INCOMPLETE CHANNEL INFORMATION

(75) Inventor: Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 925 days.

(21) Appl. No.: 12/704,207

(22) Filed: Feb. 11, 2010

(65) Prior Publication Data

US 2010/0202548 A1  Aug. 12, 2010

Related U.S. Application Data

(60) Provisional application No. 61/152,187, filed on Feb. 12, 2009.

(51) Int. Cl.
*H04L 27/28* (2006.01)

(52) U.S. Cl.
USPC ............................................. 375/260

(58) Field of Classification Search
USPC ........ 375/260, 130, 142, 147, 148, 267, 316, 375/346, 347, 349; 342/373; 370/321, 316; 455/562.1
See application file for complete search history.

(56) References Cited

U.S. PATENT DOCUMENTS

| 2007/0071147 A1 | 3/2007 | Sampath et al. |
| 2008/0139153 A1 | 6/2008 | Luo et al. |
| 2008/0225960 A1 | 9/2008 | Kotecha et al. |
| 2009/0322613 A1* | 12/2009 | Bala et al. .................... 342/373 |

FOREIGN PATENT DOCUMENTS

| CN | 101047414 | 10/2007 |
| CN | 101154975 | 4/2008 |
| CN | 101356745 | 1/2009 |
| KR | 20020037965 A | 5/2002 |
| KR | 20060039580 A | 5/2006 |
| WO | WO 2007-096820 A1 | 8/2007 |

OTHER PUBLICATIONS

International Search Report and Written Opinion of Patent Cooperation Treaty (PCT), International Application No. PCT/CN2010/070678, date of mailing May 20, 2010, Applicant Huawei Technologies Co., Ltd., 9 pages.
Telatar, E., "Capacity of Multi-antenna Gaussian Channels," European Transactions on Telecommunicaions, Nov./Dec. 1999, pp. 1-28,vol. 10.
Tomcik, J., "QTDD Performance Report 2," IEEE 802.20 Working Group on Mobile Broadband Wireless Access, IEEE C802.20-05/88, Nov. 15, 2005, pp. 1-56, IEEE.
QUALCOMM Incorporated, "Qualcomm Proposal for 3GPP2 Physical Layer," C30-20060522-035R1_QCOM_Proposal_v5.0, May 22, 2006, Denver, CO.
Partial Translation of First Office Action of Chinese Application No. 201080006942.0, mailing date Apr. 3, 2013, 9 pages.

* cited by examiner

*Primary Examiner* — Khai Tran
(74) *Attorney, Agent, or Firm* — Slater & Matsil, L.L.P.

(57) ABSTRACT

A system and method for wireless communications using spatial multiplexing with incomplete channel information is provided. A method for wireless communications includes receiving a reference signal from a communications device, computing at least one first beamforming vector from the received reference signal, selecting at least one second beamforming vector from channel statistics, and transmitting information to the communications device. The reference signal is transmitted using a subset of antennas used for data reception at the communications device, and the transmitting uses the at least one first beamforming vector and the at least one second beamforming vector.

21 Claims, 3 Drawing Sheets

$$H = \begin{bmatrix} h_1^H \\ h_2^H \end{bmatrix}$$

SYSTEM AND METHOD FOR WIRELESS COMMUNICATIONS USING SPATIAL MULTIPLEXING WITH INCOMPLETE CHANNEL INFORMATION

This application claims the benefit of U.S. Provisional Application No. 61/152,187, filed on Feb. 12, 2009, entitled "Spatial Multiplexing with Incomplete Channel Information in MIMO Systems," which application is hereby incorporated herein by reference.

TECHNICAL FIELD

The present invention relates generally to wireless communications, and more particularly to a system and method for wireless communications using spatial multiplexing with incomplete channel information.

BACKGROUND

Generally, in wireless communications systems knowledge of downlink (DL) channel information may be essential for efficient beamforming to one or more users. The transmission of information to two or more users is commonly referred to as spatial multiplexing.

DL channel information may be provided by a receiver (e.g., a mobile station, a user, a terminal, a User Equipment, and so on) to a transmitter (e.g., a NodeB, an enhanced NodeB, a base station, a base terminal station, a relay station, and so forth) over a feedback channel. In frequency division duplexing (FDD) communications systems, the receiver may estimate or measure the DL channel and then feed the DL channel information back to the transmitter. The DL channel information may be fedback in its raw form, a quantized version (a codeword from a codebook known by both the receiver and the transmitter), an index to the quantized version (e.g., an index to the codeword from the codebook), or so on.

In time-division duplexing (TDD) communications systems, when calibrated antenna arrays are used, uplink (UL) and DL channels may be almost identical. Channel reciprocity may be a commonly used term to describe this phenomenon. Since the UL and DL channels may be almost identical, it may be possible for a receiver to transmit a sounding reference signal in an UL channel to a transmitter, the transmitter may measure the UL channel using the sounding reference signal, and the transmitter may use the information about the UL channel in its DL transmission to the receiver.

However, in practical communications systems, the receiver may not have an equal number of receive radio frequency (RF) chains and transmit RF chains. For example, a receiver may have two receive antennas but only one transmit antenna, i.e., a first of the two receive antennas may also transmit, but a second of the two receive antennas may only receive. Therefore, only a portion of the channel state information is available through sounding reference signal measurement, providing incomplete channel state information (I-C SI).

SUMMARY OF THE INVENTION

These and other problems are generally solved or circumvented, and technical advantages are generally achieved, by embodiments of a system and method for wireless communications using spatial multiplexing with incomplete channel information.

In accordance with an embodiment, a method for wireless communications is provided. The method includes receiving a reference signal from a communications device, computing at least one first beamforming vector from the received reference signal, selecting at least one second beamforming vector based on channel statistics, and transmitting information to the communications device. The reference signal is transmitted using a subset of antennas used for data reception at the communications device, and the transmitting uses the at least one first beamforming vector and the at least one second beamforming vector.

In accordance with another embodiment, a method for wireless communications is provided. The method includes transmitting a reference signal using a subset of antennas used for receiving information to a communications controller, and receiving information from the communications controller. The information is precoded using beamforming vectors, with a first subset of the beamforming vectors computed based on the transmitted reference signal, and a second subset of the beamforming vectors selected based on channel statistics.

In accordance with another embodiment, a communications controller is provided. The communications controller includes a receiver for receiving a reference signal, a beamforming vector compute unit coupled to the receiver, and a beamforming vector select unit coupled to the receiver. The beamforming vector compute unit computes at least one first beamforming vector based on the received reference signal, and the beamforming vector select unit selects at least one second beamforming vector based on channel statistics.

An advantage of an embodiment is that available channel state information and channel statistical information are used to compute missing or incomplete channel state information to enable spatial multiplexing with beamforming vectors in a MIMO wireless communications system.

A further advantage of an embodiment is that channel statistical information is used to select the beamforming vectors, thereby yielding better beamforming performance than selecting beamforming vectors without having instantaneous channel information in a random manner.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a WiMAX compliant communications system with user equipment (UE) having more receive antennas than transmit antennas. The invention may also be applied, however, to other communications systems that support spatial multiplexing where UEs have more receive antennas than transmit antennas, such as Third Generation Partnership Project (3GPP) Long Term Evolution (LTE), 3GPP LTE-Advanced, and so forth.

Figure 1:
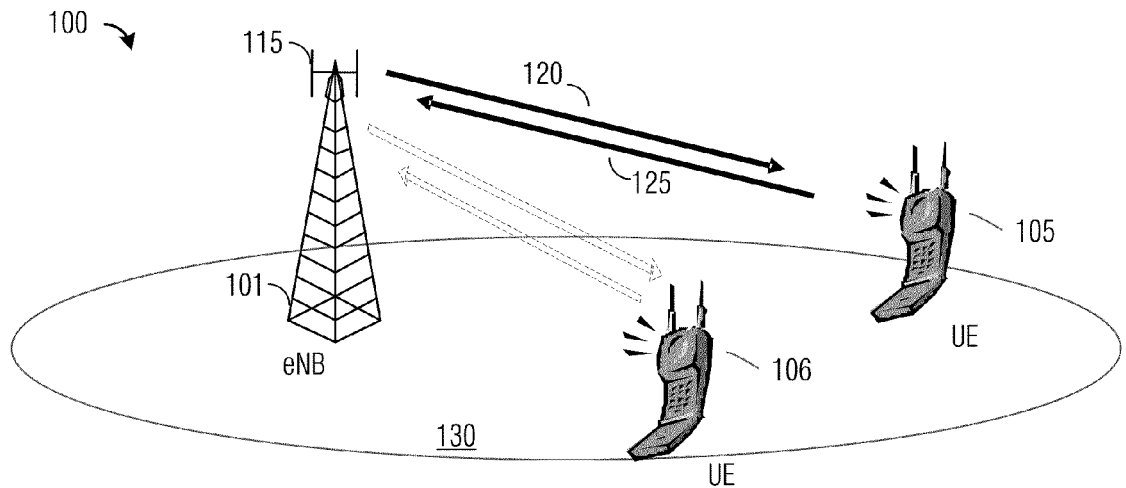
FIG. 1 is a diagram of a wireless communications system.

FIG. 1 illustrates a wireless communications system 100. Wireless communications system 100 includes an enhanced NodeB (eNB) 101 and a user equipment (UE) 105 and UE 106, which may be mobile or fixed. eNB 101 and UE 105 and UE 106 may communicate using wireless communications. eNB 101 has a plurality of transmit antennas 115, while UE 105 and UE 106 may have one or more receive antennas. eNB 101 sends control information and data to UE 105 through downlink (DL) channel 120, while UE 105 sends control information and data to eNB 101 through uplink (UL) channel 125. eNB 101 and UE 106 may also communicate over similar channels.

In general, an eNB, such as eNB 101, may also be referred to as a base station, base transceiver station, a NodeB, and so forth. Similarly, a UE, such as UE 105, may also be referred to as a subscriber unit, a user, a subscriber, a mobile station, a terminal, and so on.

UE 105 may send control information on UL channel 125 to improve the quality of the transmission on DL channel 120. eNB 101 may send control information on DL channel 120 for the purpose of improving the quality of uplink channel 125. A cell 130 is a conventional term for the coverage area of eNB 101. It is generally understood that in wireless communications system 100 there may be multiple cells corresponding to multiple eNBs, as well as multiple UEs.

Spatial multiplexing is a known method for increasing data rate in multiple input, multiple output (MIMO) communications systems. Furthermore, it is also known that in a MIMO communications link, knowledge of the channel (i.e., channel state information) may also help increase the capacity of the MIMO communications link. For example, when complete instantaneous knowledge of the channel is available at a transmitter, correct singular vectors of a channel matrix may provide optimal directions for transmitting parallel data streams. Additionally, when statistical knowledge of the channel is available, eigen directions of the channel state information matrix are also known to be optimal directions for parallel data transmission in MIMO channels.

eNB 101 may exploit spatial multiplexing to increase data rate in wireless communications system 100. For example, although DL channel 120 between eNB 101 and UE 105 is shown as a single channel, DL channel 120 may actually be multiple parallel data streams with each parallel data stream transmitted by a transmit antenna in plurality of transmit antennas 115. Similarly, eNB 101 may also use spatial multiplexing in its transmissions to UE 106.

Figure 2:
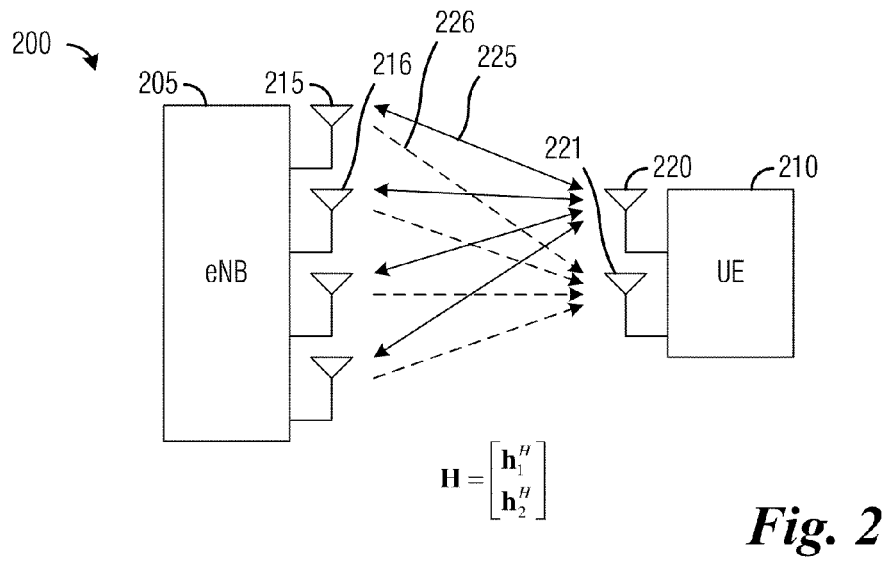
FIG. 2 is a diagram of a model of communications between an eNB and a UE.

FIG. 2 illustrates a model 200 of communications between an eNB 205 and a UE 210. For discussion purposes of model 200, let eNB 205 have $N_t$ antennas and UE 210 have $N_r$ antennas. Furthermore, let all $N_t$ at eNB 205 be operable as both transmit and receive antennas, but for all $N_r$ antennas at UE 210 only one may operate as a transmit antenna while all may operate as receive antennas.

As shown in FIG. 2, eNB 205 may have multiple antennas, such as antennas 215 and 216 that may operate as both receive and transmit antennas. eNB 205 is shown in FIG. 2 as having four antennas ($N_t=4$). However, an eNB may have any number of antennas, such as one, two, three, four, five, six, and so forth. Therefore, the illustrative example of eNB 205 having four transmit/receive antennas should not be construed as being limiting to either the scope or the spirit of the embodiments.

Also as shown in FIG. 2, UE 210 may have multiple antennas ($N_r=2$), such as antennas 220 and 221. In order to simplify UE design, it may often be the case that a UE may not have the same number of transmit and receive antennas. For example, antenna 220 of UE 210 may be used as both a transmit antenna and a receive antenna, while antenna 221 may only be used as a receive antenna.

Arrowed lines represent channels between eNB 205 and UE 210. For example, arrowed line 225 represents a bi-directional (both DL and UL channels) channel between antenna 215 and antenna 220, while dotted arrowed line 226 represents a uni-directional (only DL channel) channel between antenna 215 and antenna 221.

Consider a flat fading MIMO model of a communications channel expressible as:

$$Y = H \cdot x + n,$$

where $H \in \mathbb{C}^{N_r \times N_t}$ is the MIMO channel response, and n is additive noise that is white in nature with $CN(0, \sigma^2 I_{N_r})$ distribution. In a situation where $N_r=2$, a downlink channel matrix may be represented as $$H = \begin{bmatrix} h_1^H \\ \vdots \\ h_{N_r}^H \end{bmatrix}_{N_r \times N_t} = \begin{bmatrix} h_1^H \\ h_2^H \end{bmatrix}$$

where $h_1$ through $h_{N_r}$ are the UL responses corresponding to the antennas $1, 2, \ldots, N_r$ at UE 210. As discussed previously, it is assumed that only one antenna (antenna 220) may send sounding reference signals, therefore $h_1$ is known at eNB 205 but channel responses corresponding to antennas $h_2, \ldots, h_{N_r}$ are unknown. As shown in FIG. 2, the arrowed lines (such as arrowed line 225) illustrate channel $h_1$ from eNB 205 to antenna 220 and the dotted arrowed lines (such as dotted arrowed line 226 illustrate channel $h_2$ from eNB 205 to antenna 221. Although when $N_r=2$, $h_2$ is unknown, its correlation $E[h_2 h_2^H] = R_2$ is known. Additionally, a total transmit power P is also known, i.e., $E[x^H x] \le P$.

When $N_r=2$, the rank of the channel is two, therefore, two independent streams may be transmitted $$x=\sqrt{P_1}\cdot s_1\cdot u_1+\sqrt{P_2}\cdot s_2\cdot u_2$$

such that $P=P_1+P_2$, $s_1$ and $s_2$ are transmitted symbols in directions $u_1$ and $u_2$ (also referred as beamforming directions or beamforming vectors), respectively, with $$E[|s_1|^2]=E[|s_2|^2]=1.$$

The signal model may be expressed as $$Y=H\cdot F\cdot s+n,$$

where $$F=[u_1\ u_2]\cdot\begin{bmatrix}\sqrt{P_1} & 0\\ 0 & \sqrt{P_2}\end{bmatrix}$$

is a precoder matrix used at eNB 205 to beamform transmissions, and $$s=\begin{bmatrix}s_1\\ s_2\end{bmatrix}$$

is a vector of transmitted symbols.

The problem to be solved is to find beamforming directions $u_1$ and $u_2$ to send M independent data streams such that the overall throughput is maximized.

A capacity of the communications system with full knowledge of H may be expressed as:

$$C=\text{logdet}\left(I+\frac{HQH^H}{\sigma^2}\right),$$

where $Q=E[xx^H]=FF^H$ is a covariance of the transmitted signal x. With $h_1$ known and only statistics of $h_2$, it may be possible to smooth out the capacity C with respect to the unknown channel, which may be expressible as:

$$C(h_1,R_2,Q)=E_{h_2}\left[\text{logdet}\left(I+\frac{HQH^H}{\sigma^2}\right)\right].$$

The optimal input covariance matrix may be obtained by maximizing the capacity, expressible as:

$$Q_{opt}=\underset{Q}{\text{argmax}}\ C(h_1,R_2,Q).$$
$$s.t. Tr(Q)\leq P$$
$$rank(Q)\leq 2$$

When $R_2\neq I_{N_t}$, determining the optimal solution based on the above discussion may be difficult due to a non-convexity of a cost function with respect to the precoding vectors. Therefore, it may not be possible to use standard optimization methods such as gradient descent, interior-point method, or so on, to find the optimal beamforming directions.

However, near-optimal solutions may be found using dominant eigenvectors of the correlation matrix since they provide principal directions that an unknown channel vector may take. The embodiments disclosed herein determine the beamforming directions by combining explicit channel information (e.g., $h_1$), with statistical information provided by the eigenspace of the correlation matrix.

Although the discussion above focuses on a receiver with two receive antennas and one transmit antenna, the embodiments are operable with other situations wherein there are more receive antennas than transmit antennas. Therefore, in the discussion of receivers, two receive antennas and one transmit antenna should not be construed as being limiting to either the scope or the spirit of the embodiments.

Figure 3A:
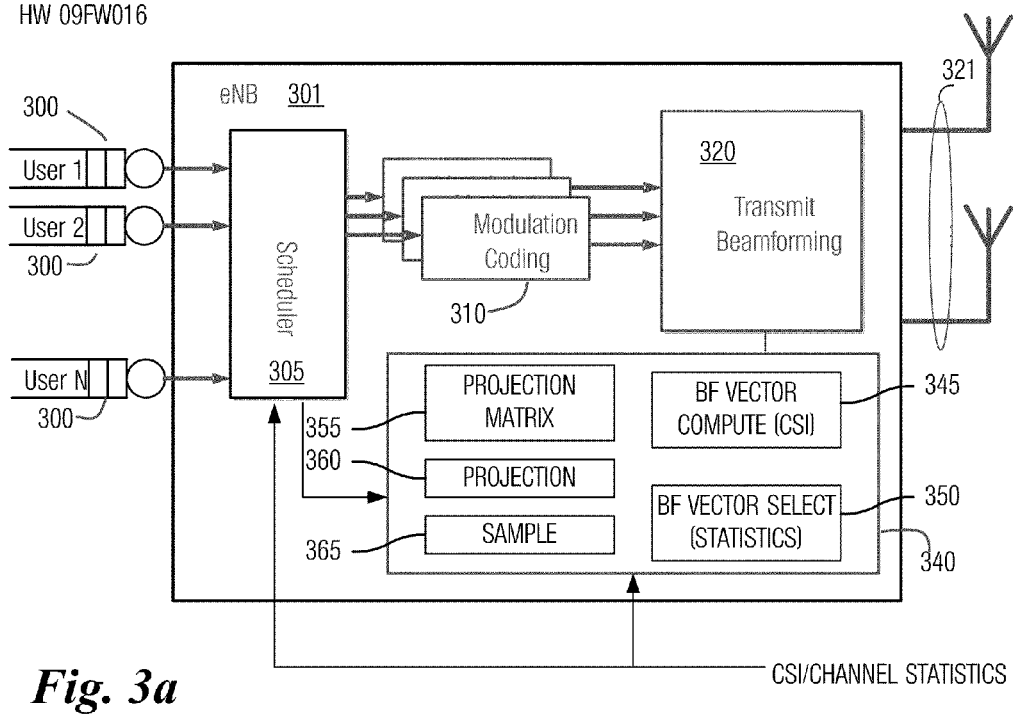
FIG. 3a is a diagram of an eNB that makes use of channel statistics to compute/select beamforming vectors.

FIG. 3a illustrates an eNB 301 that makes use of channel statistics to compute beamforming vectors. Data 300 destined for a plurality of UEs being served by eNB 301, in the form of bits, symbols, or packets, for example, may be sent to a scheduler 305, which may decide which UEs will transmit in a given time/frequency opportunity. Scheduler 305 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) fedback from a plurality of UEs.

Data from UEs selected for transmission may be processed by a modulation and coding block 310 to convert the data to transmitted symbols. Modulation and coding block 310 may also add redundancy for the purpose of assisting with error correction and/or error detection. A modulation and coding scheme implemented in modulation and coding block 310 may be chosen based in part on information about the channel quality information feedback (in the form of channel quality indicators or other short term information).

The output of modulation and coding block 310 may be passed to a transmit beamforming block 320, which maps the output (a modulated and coded stream for each UE) onto a beamforming vector. The beamformed outputs may be coupled to antennas 321 through RF circuitry, which are not shown. Although shown in FIG. 3a as having only two antennas, it should be understood that eNB 301 may have any number of antennas. The transmit beamforming vectors are input from a beamforming vector compute block 340.

Beamforming vector compute block 340 produces beamforming vectors from the channel quality information feedback received from the UEs. Due to incomplete channel state information, beamforming vector compute block 340 may make use of channel statistics recorded or computed by eNB 301 as it operates, to compute additional channel state information needed to determine all of the needed transmit beamforming vectors.

Beamforming vector compute block 340 includes a beamforming vector compute from CSI block 345 that may directly compute some of the transmit beamforming vectors from the CSI feedback by the UEs. For example, referencing FIG. 2, beamforming vector compute from CSI block 345 may be able to compute beamforming vector $w_1$ from channel state information provided regarding the channel represented by arrowed line 225.

Beamforming vector compute block 340 includes a beamforming vector select block 350 that may select beamforming vectors using channel statistics. The channel statistics may be provided by eNB 301 based on measurements of sounding reference signals transmitted by the UEs and/or historical information recorded by eNB 301.

Beamforming vector compute block 340 also includes a projection matrix block 355 and a projection block 360. Projection matrix block 355 may be used to form a projection matrix from the incomplete channel state information as well as beamforming vectors computed from the channel state information. Projection block 360 may be used to project a correlation matrix for channels without channel state information onto the projection matrix formed by projection matrix block 355. Information produced by projection matrix block 355 and projection block 360 may be used by beamforming vector select block 350 to select beamforming vectors. A sample unit 365 may be used to take time-frequency samples of channels with complete channel state information for use in the selection of beamforming vectors using channel statistics.

Figure 3B:
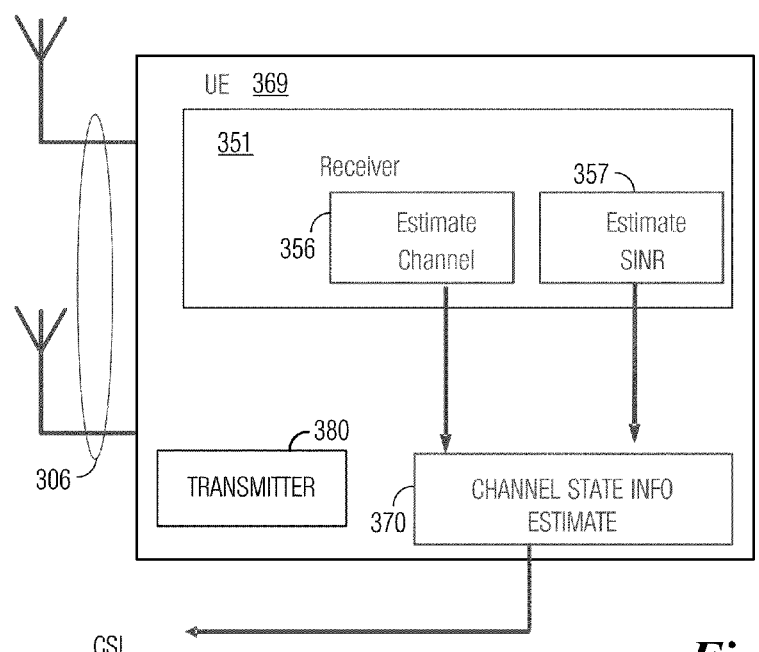
FIG. 3b is a diagram of a UE that provides channel information feedback to an eNB in the form of channel state information.

FIG. 3b illustrates a UE 369 that provides channel information feedback to an eNB in the form of channel state information. UE 369 may have one or a plurality of receive antennas 306, connecting through RF circuitry (not shown) to a receiver signal processing block 351. Some of the key functions performed by receiver signal processing block 351 may be channel estimation block 356 and estimate signal-to-interference-plus-noise ratio (SINR) block 357. Channel estimation block 356 uses information inserted into the transmit signal in the form of training signals, training pilots, or structure in the transmitted signal such as cyclostationarity to estimate coefficients of the channel between eNB 301 and UE 369, i.e., perform channel estimation.

The output of channel estimation block 356 (channel state information, for example) may be provided to channel state information estimate block 370, which may estimate the channel state information from the output of channel estimation block 356. The channel state information (estimated) may be fedback to eNB 301 to be used to aid scheduling and transmit beamforming, for example. Prior to feeding back the channel state information, the channel state information may be quantized to reduce the amount of information being fedback.

UE 369 may also include a transmitter 380 coupled to one or more transmit antennas 306 that may be used to transmit a sounding reference signal that may be used by eNB 301 to compute estimates of UL communications between UE 369 and eNB 301. Although UE 369 may have multiple transmit antennas, generally, UE 369 may have more receive antennas than transmit antennas.

Figure 4A:
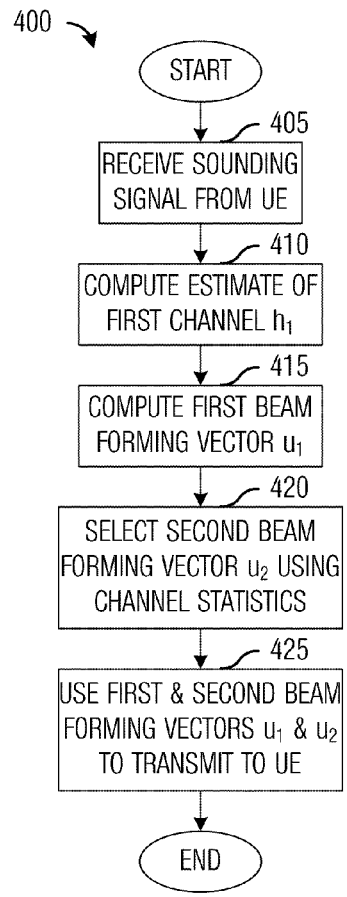
FIG. 4a is a flow diagram of eNB operations in communicating with incomplete channel state information.

FIG. 4a illustrates a flow diagram of eNB operations 400 in communicating with incomplete channel state information. eNB operations 400 may be indicative of operations occurring in an eNB, such as eNB 301, as the eNB communicates to a UE, such as UE 369, using spatial multiplexing. The eNB may make use of a sounding signal transmitted by the UE to obtain channel state information about communications channels between the UE and itself. However, the UE may have more receive antennas than transmit antennas, therefore the eNB may not be able to obtain complete channel state information about the communications channels. The eNB may make use of channel statistics, from measurements or historical information that it has recorded itself eNB operations 400 may occur while the eNB and the UE are in normal operations and are communicating using spatial multiplexing.

eNB operations 400 may begin with the eNB receiving a sounding reference signal transmitted by the UE (block 405). The sounding reference signal may be a reference sequence unique to the UE that is periodically transmitted by the UE to allow a receiver of the transmission to determine channel state information of a communications channel between the UE and itself, i.e., an UL communications channel. Furthermore, in time-division duplexing (TDD) communications systems, channel reciprocity may be used to determine channel state information regarding a DL communications channel between the receiver and the UE.

The eNB may use the received sounding reference signal to compute an estimate of a first channel $h_1$ (block 410). The eNB may use any of a wide variety of techniques to compute the estimate of the first channel from the received sounding reference signal. With the estimate of the first channel $h_1$ computed, the eNB may then compute a first beamforming vector (beamforming direction) $u_1$ (block 415). According to an embodiment, the first beamforming vector $u_1$ may be computed as:

$$u_1 = \frac{h_1}{\|h_1\|}.$$

The eNB may then select a second beamforming vector $u_2$ using channel statistics (block 420). According to an embodiment, the channel statistics may be computed by the eNB from measurements made or recorded by the eNB. Detailed discussions of the selection of the second beamforming vector $u_2$ using channel statistics are provided below.

With the first beamforming vector computed and the second beamforming vector selected, the eNB may use the first and second beamforming vectors to precode transmissions to the UE (block 425). eNB operations 400 may then terminate.

Figure 4B:
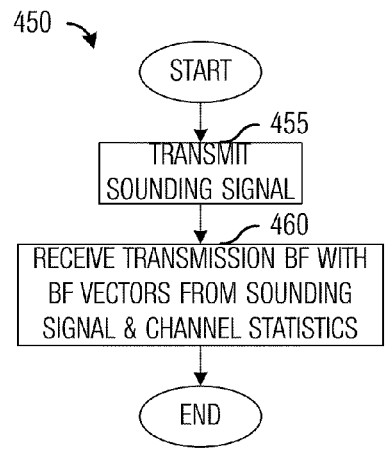
FIG. 4b is a flow diagram of UE operations in communicating with incomplete channel state information.

FIG. 4b illustrates a flow diagram of UE operations 450 in communicating with incomplete channel state information. UE operations 450 may be indicative of operations occurring in a UE, such as UE 369, as the UE communicates with an eNB, such as eNB 301, using spatial multiplexing. UE operations 450 may occur while the UE and the eNB are in normal operations and are communicating using spatial multiplexing.

UE operations 450 may begin with the UE transmitting a sounding reference signal to the eNB (block 455). The sounding reference signal may be a reference sequence unique to the UE that is periodically transmitted by the UE to allow a receiver of the transmission to determine channel state information of a communications channel between the UE and itself, i.e., an UL communications channel. Furthermore, in TDD communications systems, channel reciprocity may be used to determine channel state information regarding a DL communications channel between the receiver and the UE.

The UE may then receive a transmission from the eNB, wherein the transmission has been beamformed with beamforming vectors computed based on the sounding reference signal and selected using channel statistics (block 460). Some of the beamforming vectors may be directly computed based on the sounding reference signal, while some of the beamforming vectors may be selected using channel statistics either determined by the eNB. UE operations 450 may then terminate.

Figure 5B:
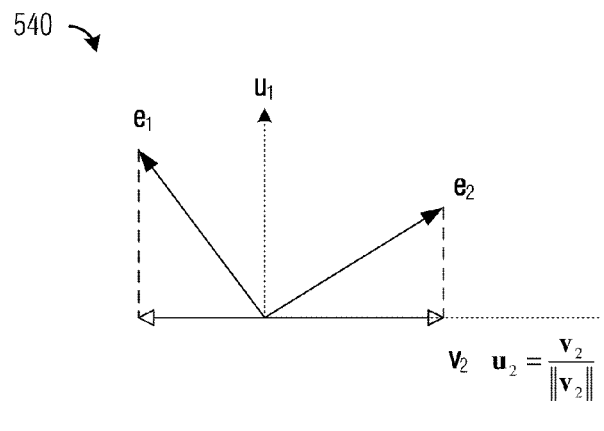
FIG. 5b is a diagram of two eigenvectors.
Figure 5A:
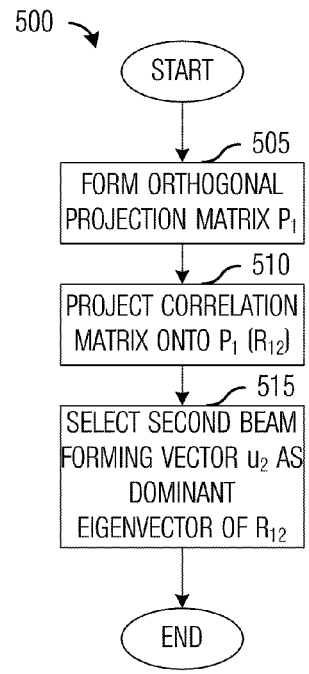
FIG. 5a is a flow diagram of first eNB operations in selecting a beamforming vector using channel statistics.

FIG. 5a illustrates a flow diagram of first eNB operations 500 in selecting a beamforming vector using channel statistics. eNB operations 500 may be indicative of operations occurring in an eNB, such as eNB 301, as the eNB selects a beamforming vector using channel statistics instead of directly computing the beamforming vector from channel state information due to incomplete channel state information. eNB operations 500 may occur while the eNB is in a normal operating mode and communicating with a UE, such as UE 369, using spatial multiplexing. eNB operations 500 may be an implementation of block 420 of FIG. 4a, selecting a second beamforming vector using channel statistics.

eNB operations 500 may begin with the eNB forming an orthogonal projection matrix $P_1$ (block 505). According to an embodiment, forming an orthogonal projection matrix $P_1$ may be expressed as:

$$P_1 = \left(I - \frac{h_1 h_1^H}{\|h_1\|^2}\right),$$

where I is an identity matrix, $h_1$ is a beamforming vector computed based on channel state information, and $h_1^H$ is the Hermitian transpose of $h_1$.

The eNB may then project the correlation matrix $R_2$ onto the orthogonal projection matrix $P_1$ (block 510). According to an embodiment, projecting the correlation matrix $R_2$ onto the orthogonal projection matrix $P_1$ may be expressed as:

$$R_{12} = P_1 \cdot R_2 \cdot P_1.$$

The eNB may then select a dominant eigenvector of $R_{12}$ as the second beamforming vector $u_2$ (block 515). According to an embodiment, selecting the dominant eigenvector of $R_{12}$ as the second beamforming vector $u_2$ may be expressed as:

$$u_2 = \underset{\|u\|=1}{\operatorname{argmax}} u^H R_{12} u.$$

eNB operations 500 may then terminate.

FIG. 5b illustrates a diagram 540 of two eigenvectors. Let $e_1$ and $e_2$ be two dominant eigendirections of $R_2$. Let $u_1$ be chosen as a first vector and defined as $$u_1 = \frac{h_1}{\|h_1\|},$$

then $e_1$ and $e_2$ may be projected onto an orthogonal subspace of $h_1$. As shown in FIG. 5b, $v_2$ may have the highest norm in the orthogonal subspace of $h_1$ and may be chosen as a second vector $u_2$. Second vector $u_2$ may be vector $v_2$ normalized by its norm, namely, $$u_2 = \frac{v_2}{\|v_2\|}.$$

Figure 5C:
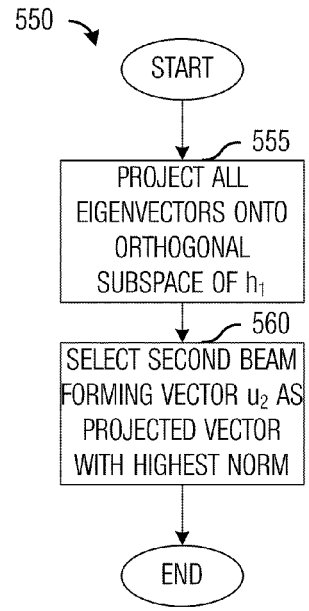
FIG. 5c is a flow diagram of second eNB operations in selecting a beamforming vector using channel statistics.

FIG. 5c illustrates a flow diagram of second eNB operations 550 in selecting a beamforming vector using channel statistics. eNB operations 550 may be indicative of operations occurring in an eNB, such as eNB 301, as the eNB selects a beamforming vector using channel statistics instead of directly computing the beamforming vector from channel state information due to incomplete channel state information. eNB operations 550 may occur while the eNB is in a normal operating mode and communicating with a UE, such as UE 369, using spatial multiplexing. eNB operations 550 may be an implementation of block 420 of FIG. 4a, selecting a second beamforming vector using channel statistics.

eNB operations 550 may begin with the eNB projecting all eigenvectors (or at least the dominant eigenvectors) of $R_2$ onto an orthogonal subspace of $h_1$ (block 555). The eNB may then select an eigenvector having the largest norm in the orthogonal subspace of $h_1$ as a second beamforming vector $u_2$ (block 560). Second beamforming vector $u_2$ has unit norm since $$u_2 = \frac{v_2}{\|v_2\|}.$$

According to an embodiment, selecting an eigenvector having the largest norm in the orthogonal subspace of $h_1$ as a second beamforming vector $u_2$ may be expressed as:

$$k^* = \underset{k}{\operatorname{argmax}} \left\|\left(I - \frac{h_1 h_1^H}{\|h_1\|^2}\right) \cdot e_k\right\|^2,$$

and $$u_2 = \frac{\left(I - \frac{h_1 h_1^H}{\|h_1\|^2}\right) \cdot e_{k^*}}{\left\|\left(I - \frac{h_1 h_1^H}{\|h_1\|^2}\right) \cdot e_{k^*}\right\|},$$

where $e_k$ is a k-th eigenvector, and k is a positive integer value. eNB operations 550 may then terminate.

The embodiments rely on an assumption that $R_2 = E[h_2 h_2^H]$ is known at the eNB. However, if, as in a WiMAX compliant communications system, the sounding reference signal is only transmitted from one of the antennas of the UE (assuming that the UE has two antennas total), then $R_2$ may not be directly computed. It may be possible to collect samples of UL channel measurements from the UE antenna that is used to transmit the sounding reference signal, a correlation matrix $R_1$ may be formed.

The correlation matrix $R_1$ may be used in place of $R_2$ under an assumption that $R_1 \approx R_2$. If the antennas at the eNB are not spaced too far apart, then the assumption may be reasonable since the antennas see the same set of scatterers.

In order to estimate the spatial covariance matrix $R_1$, a mean may be taken of time-frequency samples of a channel, the mean of the time-frequency samples of the channel may be expressed as:

$$R_1 = \frac{1}{|T| \cdot |F|} \sum_{t \in T, f \in F} h_1(t, f) \cdot h_1^H(t, f),$$

where T and F are sets of time-frequency indices of the measured channel. To get a good estimate, a total number of time-frequency samples may need to be large (e.g., greater than 50). However, in practice, it may not be practical to wait for so many samples or there may not be a sufficient number of samples available. In such a situation, it may be possible to filter the measured covariance matrix using measurements from previous time slots. A simple way may be to use an exponential averaging filter, such as one expressible as:

$$\hat{R}_1(n) = \beta \cdot \hat{R}_1(n-1) + (1-\beta) \cdot R_1(n).$$

The filtering may alternatively make use of an infinite impulse response (IIR), finite impulse response (FIR), or other types of filters.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communications, the method comprising:
   receiving a reference signal from a communications device, wherein the reference signal is transmitted using a subset of antennas used for data reception at the communications device;
   computing at least one first beamforming vector from the received reference signal;
   selecting at least one second beamforming vector in accordance with channel statistics;
   precoding information using the at least one first beamforming vector and the at least one second beamforming vector; and
   transmitting the precoded information to the communications device.

2. The method of claim 1, wherein the reference signal comprises a sounding signal transmitted by the communications device, and wherein the subset of antennas comprises fewer antennas than the antennas used for data reception.

3. The method of claim 1, wherein computing at least one first beamforming vector comprises:
   computing an estimate of at least one communications channel using the received reference signal; and
   computing the at least one first beamforming vector in accordance with the computed estimate of the at least one communications channel.

4. The method of claim 3, wherein computing the at least one beamforming vector in accordance with the computed estimate comprises evaluating $$u_1 = \frac{h_1}{\|h_1\|},$$

where $u_1$ is the at least one beamforming vector, and $h_1$ is the computed estimate of the at least one communications channel.

5. The method of claim 3, wherein the subset comprises n antennas, where n is a positive integer number, and wherein computing an estimate of at least one communications channel comprises computing an estimate for each of n communications channels.

6. The method of claim 1, wherein selecting at least one second beamforming vector comprises:
   forming an orthogonal projection matrix;
   projecting a correlation matrix onto the orthogonal projection matrix; and
   selecting a dominant eigenvector of the projected correlation matrix on the orthogonal projection matrix as the at least one second beamforming vector.

7. The method of claim 6, wherein forming an orthogonal projection matrix comprises evaluating $$P_1 = \left(I - \frac{h_1 h_1^H}{\|h_1\|^2}\right),$$

where $P_1$ is the orthogonal projection matrix, I is an identity matrix, $h_1$ is a computed estimate of an at least one communications channel related to the received reference signal and is computed from the received reference signal, and $h_1^H$ is a Hermitian transpose of $h_1$.

8. The method of claim 6, wherein projecting a correlation matrix comprises evaluating $$R_{12} = P_1 \cdot R_2 \cdot P_1,$$

where $R_{12}$ is the projected correlation matrix on the orthogonal projection matrix, and $R_2$ is a correlation matrix.

9. The method of claim 8, wherein the correlation matrix is defined as $$R_2 = E[h_2 h_2^H],$$

where $h_2$ is an estimate of an at least one communications channel, and $h_2^H$ is a Hermitian transpose of $h_2$.

10. The method of claim 8, wherein the correlation matrix is approximated by computing a mean of time-frequency samples of at least one communications channel corresponding to the subset of antennas used to transmit the reference signal.

11. The method of claim 10, wherein the time-frequency samples are filtered.

12. The method of claim 6, wherein selecting a dominant eigenvector comprises evaluating $$u_2 = \underset{\|u\|=1}{\mathrm{argmax}}\, u^H R_{12} u,$$

where $u_2$ is the at least one second beamforming vector, and u and $u^H$ are vectors for finding eigenvectors.

13. The method of claim 1, wherein selecting at least one second beamforming vector comprises:
   projecting dominant eigenvectors of a correlation matrix onto an orthogonal subspace of at least one communications channels corresponding to the subset of antennas used to transmit the reference signal; and
   selecting a projected vector having a largest norm as the at least one second beamforming vector.

14. The method of claim 13, wherein selecting a projected vector comprises evaluating:

$$k^* = \underset{k}{\mathrm{argmax}} \left\|\left(I - \frac{h_1 h_1^H}{|h_1|^2}\right) \cdot e_k\right\|^2,$$

and $$u_2 = \frac{\left(I - \frac{h_1 h_1^H}{|h_1|^2}\right) \cdot e_{k^*}}{\left\|\left(I - \frac{h_1 h_1^H}{|h_1|^2}\right) \cdot e_{k^*}\right\|},$$

where I is an identity matrix, $h_1$ is a computed estimate of an at least one communications channel and is computed from the received reference signal, and $h_1^H$ is a Hermitian transpose of $h_1$, $e_k$ is a k-th eigenvector, and k is a positive integer value.

15. A method for wireless communications, the method comprising:
   transmitting a reference signal using a subset of antennas used for receiving information to a communications controller; and
   receiving information from the communications controller, wherein the information is precoded using beamforming vectors, wherein a first subset of the beamforming vectors is computed in accordance with the transmitted reference signal, and wherein a second subset of the beamforming vectors is selected based on channel statistics.

16. The method of claim 15, wherein the second subset of the beamforming vectors is selected in accordance with time-frequency samples of at least one communications channel between the subset of antennas and the communications controller.

17. The method of claim 16, wherein the second subset of the beamforming vectors is selected based on a mean of the time-frequency samples.

18. The method of claim 16, wherein the time-frequency samples are taken at the communications controller.

19. A communications controller comprising:
   a receiver for receiving a reference signal;
   a beamforming vector compute unit coupled to the receiver, the beamforming vector compute unit configured to compute at least one first beamforming vector in accordance with the received reference signal;
   a beamforming vector select unit coupled to the receiver, the beamforming vector select unit configured to select at least one second beamforming vector in accordance with channel statistics; and
   a transmit beamforming unit coupled to the beamforming vector compute unit and the beamforming vector select unit configured precode data using the at least one first beamforming vector and the at least one second beamforming vector.

20. The communications controller of claim 19, further comprising a channel sampling unit coupled to the receiver, the channel sampling unit configured to sample a communications channel.

21. The communications controller of claim 19, wherein the beamforming vector select unit comprises:
   a projection matrix unit coupled to the receiver, the projection matrix unit configured to form a projection matrix in accordance with the received reference signal and the at least one first beamforming vector computed from the received reference signal; and
   a projection unit coupled to the receiver, the projection unit configured to project a correlation matrix for communications channels not used to convey the reference signal onto the projection matrix.

* * * * *

UNITED STATES PATENT AND TRADEMARK OFFICE
CERTIFICATE OF CORRECTION

PATENT NO. : 8,582,672 B2
APPLICATION NO. : 12/704207
DATED : November 12, 2013
INVENTOR(S) : Shahab Sanayei It is certified that error appears in the above-identified patent and that said Letters Patent is hereby corrected as shown below:

In the Specification:

In Col. 4, line 66, Detailed Description of Illustrative Embodiments, delete " $E[\mathbf{h}_2\mathbf{h}_2^H] = \mathbf{R}_2$ ," and insert -- $E[\mathbf{h}_2\mathbf{h}_2^H] = \mathbf{R}_2$ --.

In Col. 5, line 9, Detailed Description of Illustrative Embodiments, delete " $E[|s_1|^2] = E[|_2|^2] = 1$ ," and insert -- $E[|s_1|^2] = E[|s_2|^2] = 1$ --.

In Col. 10, line 22, Detailed Description of Illustrative Embodiments, delete " $E[\mathbf{h}_2\mathbf{h}_2^H]$ ," and insert -- $E[\mathbf{h}_2\mathbf{h}_2^H]$ --.

In the Claims:

In Col. 12, line 12, claim 7, delete " $\mathbf{h}_1^H$ " and insert -- $\mathbf{h}_1^H$ --.

In Col. 12, line 24, claim 9, delete " $\mathbf{R}_2 = E[\mathbf{h}_2\mathbf{h}_2^H]$ ," and insert -- $\mathbf{R}_2 = E[\mathbf{h}_2\mathbf{h}_2^H]$ --.

In Col. 12, line 26, claim 9, delete " $\mathbf{h}_2^H$ " and insert -- $\mathbf{h}_2^H$ --.

In Col. 12, lines 56-58, claim 14, delete " $k^* = \arg\max_k \left\| \left( \mathbf{I} - \frac{\mathbf{h}_1\mathbf{h}_1^H}{|\mathbf{h}_1|^2} \right) \cdot \mathbf{e}_k \right\|^2$ "

Signed and Sealed this
Thirty-first Day of December, 2013

Margaret A. Focarino
*Commissioner for Patents of the United States Patent and Trademark Office*

CERTIFICATE OF CORRECTION (continued)
U.S. Pat. No. 8,582,672 B2

$$k^* = \arg\max_k \left\|\left(\mathbf{I} - \frac{\mathbf{h}_1 \mathbf{h}_1^H}{\|\mathbf{h}_1\|^2}\right) \cdot \mathbf{e}_k\right\|^2$$

and insert --

In Col. 12, lines 61-64, claim 14, delete "
$$\mathbf{u}_2 = \frac{\left(\mathbf{I} - \frac{\mathbf{h}_1 \mathbf{h}_1^H}{|\mathbf{h}_1|^2}\right) \cdot e_{k^*}}{\left\|\left(\mathbf{I} - \frac{\mathbf{h}_1 \mathbf{h}_1^H}{|\mathbf{h}_1|^2}\right) \cdot e_{k^*}\right\|}$$
"

and insert --
$$\mathbf{u}_2 = \frac{\left(\mathbf{I} - \frac{\mathbf{h}_1 \mathbf{h}_1^H}{\|\mathbf{h}_1\|^2}\right) \cdot e_{k^*}}{\left\|\left(\mathbf{I} - \frac{\mathbf{h}_1 \mathbf{h}_1^H}{\|\mathbf{h}_1\|^2}\right) \cdot e_{k^*}\right\|}$$
--.

In Col. 13, line 1, claim 14, delete " $\mathrm{h}_1^H$ " and insert -- $\mathbf{h}_1^H$ --.